Patented Oct. 16, 1934

1,977,272

UNITED STATES PATENT OFFICE 1,977,272

VAT DYESTUFF PASTE

Ivan Gubelmann, Wilmington, Del., assignor, by mesne assignments, to E. I. du Pont de Nemours & Company, a corporation of Delaware No Drawing. Application August 13, 1931, Serial No. 556,937. Renewed May 24, 1934

18 Claims. (Cl. 8—6)

This invention relates to vat dyestuff pastes. It is an object of this invention to provide an improved vat dyestuff paste which is particularly adapted for incorporation into printing pastes, and which, when so used, is characterized by great tinctorial strength and produces brilliant prints upon fabric. Other and further important objects of this invention will appear as the description proceeds.

It has been known in the art that when dichlorohydrin (1,3-dichloro-2-propanol; $CH_2Cl \cdot CHOH \cdot CH_2Cl$) is made to react with ammonia and the product treated with caustic alkali, various complex condensation products result, having the nature of organic bases. Depending on the relative concentrations of the reactants in the reaction zone, the products vary from salt, jelly-like, water-soluble masses to hard, insoluble resins or crystalline solids.

I have now found that if the water-soluble reaction products of dichlorhydrin and ammonia are incorporated into vat dyestuffs, they have a remarkable and beneficial effect upon their adaptability for use in printing pastes. In general, said resultant printing pastes acquire increased tinctorial strength and produce more brilliant prints as compared to the said dyestuffs when used without my novel assistants.

The said water-soluble dichlorhydrin-ammonia reaction products may be mixed with the dyestuff paste prior to the latter's incorporation into the usual thickening and reducing mixture which go to make up the printing paste, or they may be added directly to the printing paste either during or after the incorporation of the dyestuff.

The proportions of my novel assistants to be added may be varied within wide limits. In general, 5 to 50% by weight of the (aqueous) dyestuff paste, or 50 to 500% by weight of the dyestuff will produce beneficial results. These limits, however, may be exceeded if desired without detrimentally affecting the action of the assistant.

Without limiting my invention to any specific procedure, the following examples are given to illustrate my preferred mode of carrying out the same. Parts given are parts by weight.

EXAMPLE 1

*Preparation of water-soluble dichlorhydrin-ammonia reaction products*

400 parts of dichlorhydrin (obtainable, for instance, by reacting glycerine with hydrochloric acid according to Example 3 of German Patent No. 197,308) and 3200 parts of alcohol (95%) are charged into a vessel and heated to about 65° C. Ammonia gas is now circulated above the surface of the liquid mixture while the latter is being agitated, and the process is continued until about 200 parts of ammonia ($NH_3$) have been absorbed. The period of time required for this purpose may be 2 days or over. At the end of the reaction 840 parts of 10% solution of caustic soda in alcohol is added; the mixture is stirred for one hour longer, cooled and filtered. The filtrate is evaporated down to a final mass of about 1000 parts and again cooled and filtered to eliminate precipitated inorganic compounds. The filtrate is now further evaporated until no more water comes off, the latter part of the procedure being carried out preferably under vacuum.

The final product is a viscous liquid when hot, but a soft solid, light reddish mass upon cooling. It is readily soluble in water and in alcohol. It cannot be readily distilled without substantial decomposition. It analyzes 15.4% N and 2.9% Cl.

The product appears to consist predominantly of a mixture of epi-amino-hydrin compounds of the type indicated by the following probable formula:

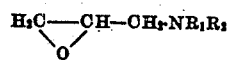

wherein $R_1$ and $R_2$ individually stand for hydrogen or the group:

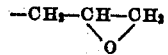

The small chlorine content is apparently due to residual quantities of initial material or intermediate compounds which escaped the action of the caustic soda. The effectiveness of the composition for the purpose of this invention seems to be due mainly to that part of the product which contains no chlorine.

EXAMPLE 2

*Preparation of the dyestuff paste*

100 parts of Anthrene blue RS (Colour Index, No. 1106) (10% paste) are mixed with 30 parts of the water-soluble reaction product obtained in Example 1, and the mixture is evaporated slowly at about 60–70° C. until its total weight is reduced to 100 parts. The resultant paste when incorporated into the usual potash-formopon paste and printed upon cotton fabric, exhibits great tinctorial strength and gives prints of exceptional brilliance.

EXAMPLE 3

50 parts of a press cake as obtained in the technical commercial manufacture of halogenated indanthrene according to Examples 1 to 4 of U. S. Patent No. 1,862,843, and containing 20% by weight of the dyestuff are mixed with 40 parts by weight of the base obtained in Example 1 and 10 parts of water. The paste is stirred well and then ground by passing twice through a colloidal mill. The resulting color paste, when incorporated with the usual thickening and reducing agents, yields upon cotton prints of greatly enhanced strength as compared to the prints obtained by using the same dyestuff but without my novel assistant.

EXAMPLE 4

100 parts of the anthraquinone-thiazole dyestuff described in Example 2 of U. S. Patent No. 993,992, are mixed with 30 parts of the reaction product obtained in Example 1, and the mixture is evaporated down to a final weight of 100 parts. The resultant mixture when used in printing pastes exhibits great tinctorial strength and brilliance. Moreover the development of the prints proceeds faster than without my novel assistant.

My novel dyestuff pastes may be converted into printing pastes in the usual manner according to any well-known procedure. This procedure may be illustrated by the following example:

EXAMPLE 5

Preparation of the printing paste 25 parts of British gum, 5 parts of corn starch, and 30 parts of cold water are mixed together into a smooth paste at about 70 to 80° C. 16 parts of potassium carbonate are now added; the mixture is stirred, cooled to about 60° C., and 16 parts of powdered hydrosulfite D are added. The mixture is further stirred and cooled and 8 parts of glycerine are added. Finally, 50 parts of the dyestuff mixture as prepared in Example 4 are added. The resultant paste, when printed upon cotton fabric and developed in the usual manner, yields yellow prints of exceptional brilliance and improved tinctorial strength.

It will be understood that many variations are possible in the procedure without departing from the spirit of this invention.

For instance, the treatment with ammonia gas in Example 1 may be prolonged or shortened, to produce reaction products of various degrees of nitrogen content. The adaptability of the dichlorhydrin-ammonia reaction product for the purpose of this invention does not depend on any precise nitrogen content. I found, for instance, that a reaction product containing as low as 8% of nitrogen by weight is highly useful in improving the printing qualities of vat dyestuffs.

Again, the quantity of the reaction product to be incorporated into 1 part of the dyestuff may vary within wide limits, as already indicated above.

If desired, other dispersing agents or assistants, such as, for instance, the sodium salt of abietenesulfonic acid, may be added to the dyestuff paste without affecting the operation of my novel assisting agents.

Other variations and modifications will readily suggest themselves to those skilled in the art.

I claim:

1. As a new composition of matter, a dyestuff paste comprising a vat dyestuff and the jelly-like, water-soluble reaction product obtainable by circulating ammonia gas over an alcoholic solution of dichlorhydrin at slightly elevated temperature and at ordinary pressure and treating the product with caustic alkali.

2. As a new composition of matter, a printing paste comprising a thickening agent, a reducing agent, a vat dyestuff and the jelly-like, water-soluble reaction product obtainable by circulating ammonia gas over an alcoholic solution of dichlorhydrin at slightly elevated temperature and at ordinary pressure and treating the product with caustic alkali.

3. The process of printing fabrics which comprises applying thereto a printing paste comprising a vat dyestuff and the jelly-like, water-soluble reaction product obtainable by circulating ammonia gas over an alcoholic solution of dichlorhydrin at slightly elevated temperature and at ordinary pressure and treating the product with caustic alkali.

4. As a new composition of matter a dyestuff paste comprising a vat dyestuff and an epi-amino-hydrin compound of type:

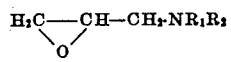

wherein $R_1$ and $R_2$ individually stand for H or the group:

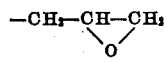

5. As a new composition of matter a dyestuff paste comprising a vat dyestuff of the indanthrene series and an epi-amino-hydrin compound of type:

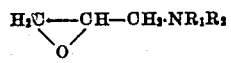

wherein $R_1$ and $R_2$ individually stand for H or the group:

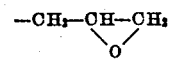

6. As a new composition of matter a dyestuff paste comprising a vat dyestuff of the anthraquinone-thiazole series and an epi-amino-hydrin compound of type:

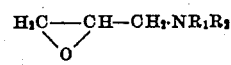

wherein $R_1$ and $R_2$ individually stand for H or the group:

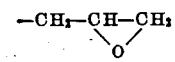

7. As a new composition of matter a dyestuff paste comprising a vat dyestuff of the indanthrene series and a water-soluble reaction product of dichlorhydrin and ammonia which has been after-treated with alkali and which consists predominantly of epi-amino-hydrin compounds.

8. As a new composition of matter a dyestuff paste comprising a vat dyestuff of the anthraquinone-thiazole series and a water-soluble reaction product of dichlorhydrin and ammonia which has been after-treated with alkali and which consists predominantly of epi-amino-hydrin compounds.

9. As a new composition of matter a dyestuff paste comprising a vat dyestuff and a water-soluble reaction product of dichlorhydrin and ammonia which has been after-treated with alkali.

10. As a new composition of matter a dyestuff paste comprising a vat dyestuff of the indanthrene series and a water-soluble reaction product of dichlorhydrin and ammonia which has been after-treated with alkali.

11. As a new composition of matter a dyestuff paste comprising a vat dyestuff of the anthraquinone-thiazole series and a water-soluble reaction product of dichlorhydrin and ammonia which has been after-treated with alkali.

12. As a new composition of matter a printing paste comprising a vat dyestuff, a water-soluble reaction product of dichlorhydrin and ammonia which has been after-treated with alkali, a thickening agent and a reducing agent.

13. As a new composition of matter a printing paste comprising a vat dyestuff of the indanthrene series, a water-soluble reaction product of dichlorhydrin and ammonia which has been after-treated with alkali, a thickening agent and a reducing agent.

14. As a new composition of matter a printing paste comprising a vat dyestuff of the anthraquinone-thiazole series, a water-soluble reaction product of dichlorhydrin and ammonia which has been after-treated with alkali, a thickening agent and a reducing agent.

15. The process of printing fabrics which comprises applying thereto a printing paste comprising a vat dyestuff and a water-soluble reaction product of dichlorhydrin and ammonia which has been after-treated with alkali.

16. The process of printing fabrics which comprises applying thereto a printing paste comprising a vat dyestuff of the indanthrene series and a water-soluble reaction product of dichlorhydrin and ammonia which has been after-treated with alkali.

17. The process of printing fabrics which comprises applying thereto a printing paste comprising a vat dyestuff of the anthraquinone-thiazole series and a water-soluble reaction product of dichlorhydrin and ammonia which has been after-treated with alkali.

18. As a new composition of matter a dyestuff paste comprising a vat dyestuff and the reaction product obtainable by reacting dichlorhydrin and ammonia under conditions favoring the production of a water-soluble compound and treating the latter with alkali until substantially free of chlorine.

IVAN GUBELMANN.